July 26, 1966 D. B. FRASER ETAL 3,263,103

RADIATION INSENSITIVE QUARTZ CRYSTAL DEVICES

Filed Jan. 3, 1963

INVENTORS D. B. FRASER
J. C. KING

BY

ATTORNEY

United States Patent Office 3,263,103

Patented July 26, 1966

3,263,103

RADIATION INSENSITIVE QUARTZ CRYSTAL DEVICES

David B. Fraser, Berkeley Heights, N.J., and James C. King, Upper Saucon Township, Lehigh County, Pa., assignors to Bell Telephone Laboratories, Incorporated, New York, N.Y., a corporation of New York Filed Jan. 3, 1963, Ser. No. 249,568
1 Claim. (Cl. 310—9.5)

Figure 1:
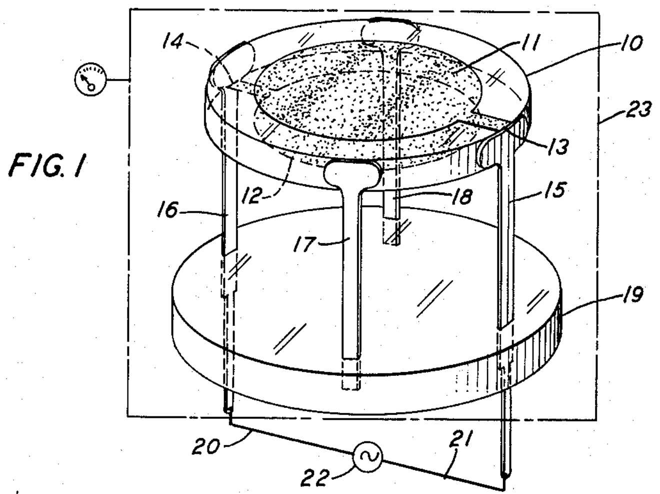

This invention is directed to novel quartz crystal resonators and more specifically to quartz resonators which are peculiarly adapted for operation in high-energy radiation environments.

Radiation damage to electrical components and equipment is of increasing interest in the operation of missile and satellite communications and for ground installations proximate to nuclear reactors or in radiation atmospheres resulting from nuclear detonations. Of vital importance to communications and guidance systems are reliable signal frequency generators. Virtually all R.F. systems employ piezoelectric signal generators which generally include quartz crystal resonators. Even the more recent microwave systems for radar, satellite communications and missile guidance systems typically rely on quartz crystal signal generators to generate a radio frequency signal, generally 5 to 100 mc., which is then multiplied to the desired microwave frequency. Some acoustic delay lines also rely on quartz crystal transducers. It is apparent then that reliable and stable quartz crystal oscillators are essential to current communications systems.

Conventional tolerance levels for frequency stability of quartz resonators are of the order of a few parts per million and less. High-energy radiation, particularly gamma radiation, is capable of causing a variation in frequency of a standard signal generator of several decades per million in a period of just a few hours. Consequently conventionally made quartz crystal resonators are essentially useless when operated in a high intensity radiation environment.

According to the present invention quartz crystal resonators can be made to show negligible frequency variation with large doses of high-energy radiation. This is achieved through the selection of a critical crystal cut.

Figure 2:
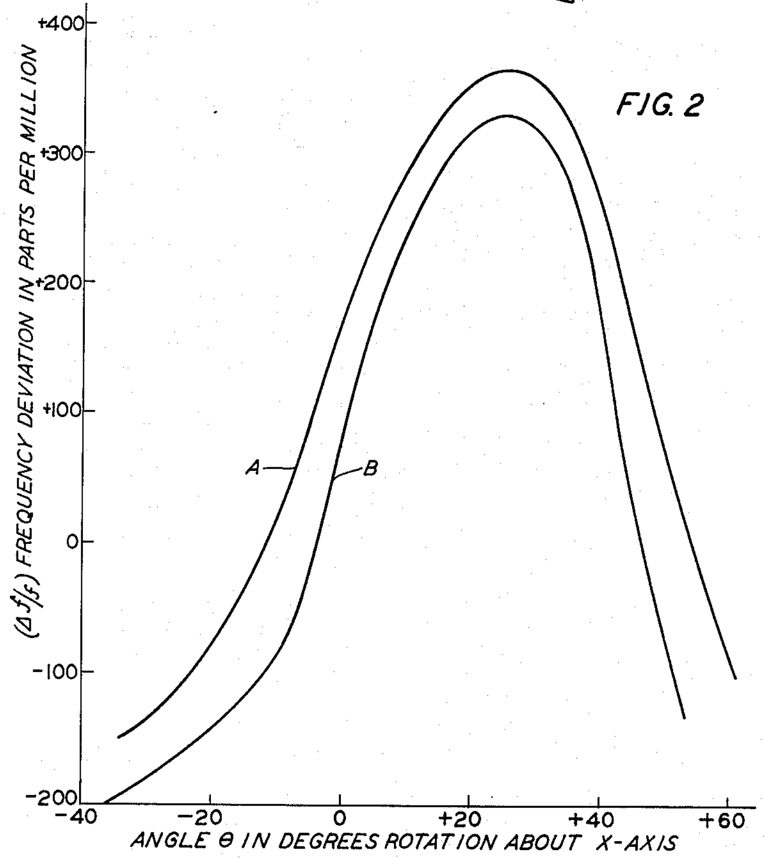

These and other aspects of the invention will become apparent from a consideration of the drawing in which:

FIG. 1 is a perspective view of a quartz crystal resonator which, when constructed according to the essential features of this invention, becomes substantially insensitive to nuclear irradiation; and FIG. 2 is a plot of frequency variation in parts per million after irradiation versus the angle of cut of the quartz crystal.

It has been demonstrated that BT-cut crystal resonators vibrating in thickness shear experience a rather large negative frequency variation with irradiation. A BT-cut crystal is a Y-cut crystal plate rotated in a negative direction about the X-axis usually of the order of −49° and operated in the thickness shear mode. The change in resonant frequency is due primarily to structural damage induced by ionization and displacement as energetic recoil ions pass through the crystal. Such damage alters the elastic constants of the material and therefore changes its resonant frequency.

The resonant frequency for a rotated Y-cut quartz plate vibrating in thickness shear is given by:

$$f=\frac{1}{2t}\sqrt{\frac{C'_{66}}{\rho}}$$

where $t$ is its thickness, $\rho$ is the density and $C'_{66}$ is the effective elastic modulus given by:

$$C'_{66}=\sin^2\theta C_{44}+\cos^2\theta C_{66}-2\sin\theta\cos\theta C_{14}$$

where $\theta$ is the angle of rotation about the X-axis and $C_{66}$, $C_{44}$ and $C_{14}$ are the elastic moduli. The significance of these coefficients and a more thorough treatment of the standard quartz crystal cuts can be found in W. P. Mason, Piezoelectric Crystals and Their Application to Ultrasonics, D. Van Nostrand Company, Inc., 1950. According to this formula the frequency deviation is equal to one-half the induced deviation in the effective elastic constant $C'_{66}$. Thus for irradiated rotated Y-cut quartz resonators $$\frac{dC'_{66}}{C'_{66}}$$

is negative.

Of far greater current interest is the performance of AT-cut quartz resonators when subject to nuclear irradiation. AT-cut crystals have achieved a dominant importance in the art. It has now been discovered that AT-cut resonators show a positive change in frequency with nuclear irradiation. In order to define a Y-cut resonator which would exhibit a negligible frequency variation with radioactive exposure, a series of quartz crystal resonators having different orientations lying between the BT-cut (Y-cut rotated −49° about X-axis) and AT-cut (Y-cut rotated +35° about X-axis) were exposed to an integrated fast (>0.1 mev.) flux of $2.31\times10^{17}$ *nvt*. The resonant frequency of all crystal units was measured at 3 and 5 mc. with the units held at 0° C. This was done by mounting the crystals in a conventional resonator mount which was inserted in a cooled evacuated enclosure.

FIG. 1 shows a typical quartz crystal mounted for shear mode resonance. This resonator consists basically of a quartz crystal, 10, cut according to the teachings of this invention. Gold film electrodes 11, and 12 (not visible), are evaporated onto the top and bottom faces of the crystal. The thickness of the crystal is selected to give the desired fundamental frequency which for the purposes of demonstrating this invention was 1 mc. At the edge of the crystal are soldered electrical contacts 13 and 14 which are in turn electrically connected to leads 15 and 16. The leads 15 and 16 may also serve as support members for the crystal and are assisted in this function by support members 17 and 18. The support members are held by a glass base 19. The electrical supports extend through the glass base and are contacted by electrical lead wires 20 and 21 which are connected across the A.C. source 22. A constant temperature evacuated enclosure 23 is used to maintain the crystal at the desired temperature within prescribed limits.

The frequency shift induced by the irradiation in units of frequency deviation in parts per million is plotted against the cut angle in FIG. 2. Curve A of FIG. 2 was obtained with a driving frequency of 5 mc. while curve B was obtained at 3 mc. Additional measurements (not shown) at the fundamental (1 mc.) lay between those obtained at 3 mc. and 5 mc. indicating that the separation between curves A and B is not suggestive of a frequency dependency for the optimum cut. From this data reasonable frequency stability with irradiation may be expected for Y-cut crystals from 0° to −20° and +40° to +60° rotation about the X-axis. The zero crossover points occur at approximately −13°, −3°, +45° and +54°. Thus particularly effective results are obtained with angles within the ranges −13° to −3° and +45° to +54°.

Since the crystal cuts to which this invention is directed are significantly removed from the "turnover points" which provide temperature stability, the crystals of this invention must necessarily be maintained within close limits of temperature. For precision devices the temperature tolerance should be ±0.01. A useful range is prescribed as ±1° C.

Crystals operating at high temperatures as disclosed in copending applications Serial Nos. 118,692 (now Patent No. 3,113,224) and 193,574, now abandoned, filed June 21, 1961, and May 9, 1962, respectively, have the inherent ability continuously to anneal out radiation damage and it would not be advantageous to use the critical crystal cut of this invention. Furthermore at high temperatures, use of the principles described in the copending applications above referred to results in a resonant crystal with a very desirable temperature coefficient. Accordingly this invention is deemed useful at temperatures below 300° C. Consequently the preferred piezoelectric device of this invention includes means for maintaining the device at a temperature below 300° C. and within ±1° C.

Whereas the foregoing description has suggested the use of the device of this invention as a signal generator, it will be apparent to those skilled in the art that other uses are possible such as frequency detectors or filters, or piezoelectric transducers in combination with acoustic devices such as delay lines.

Various other modifications and extensions of this invention will become apparent to those skilled in the art. All such variations and deviations which basically rely on the teachings through which this invention has advanced the art are properly considered within the spirit and scope of this invention.

What is claimed is:

A piezoelectric device comprising a quartz crystal, said crystal being a Y-cut crystal plate rotated in an angle about the X-axis lying in the range −3° to −13° and +45° to +54°, and electrodes attached to opposing faces of said crystal.

References Cited by the Examiner

UNITED STATES PATENTS 1,907,613 5/1933 Tiller ---------------- 310—9.5

OTHER REFERENCES

Handbook of Piezoelectric Crystals for Radio Equipment Designers, John P. Buchanan, Philco Corporation, December 1954, pp. 34–36.

MILTON O. HIRSHFIELD, *Primary Examiner.*

ORIS L. RADER, *Examiner.*

A. J. ROSSI, *Assistant Examiner.*